United States Patent [19]
Wang

[11] Patent Number: 4,794,692
[45] Date of Patent: Jan. 3, 1989

[54] EXTENDABLE AND RETRACTABLE MULTIPURPOSE MINIATURE HAND TOOL FOR USE IN MEASUREMENT, SNIPPING, AND CUTTING

[75] Inventor: Reid Wang, Taichung Hsien, Taiwan

[73] Assignee: Tair Chen Co., Ltd., Taichung Hsien, Taiwan

[21] Appl. No.: 115,827

[22] Filed: Nov. 2, 1987

[51] Int. Cl.$^4$ .............................................. B26B 11/00
[52] U.S. Cl. ........................................ 30/123; 30/146; 30/162; 30/255; 7/163
[58] Field of Search ................ 30/123, 134, 135, 146, 30/154, 155, 162, 254, 255, 340, 341; 7/118, 119, 163, 164, 160

[56] References Cited

U.S. PATENT DOCUMENTS

| | | | |
|---|---|---|---|
| 166,099 | 7/1875 | Hastings | 7/119 |
| 542,601 | 7/1895 | Baker | 30/162 |
| 850,632 | 4/1907 | Eklund | 30/146 X |
| 1,436,948 | 11/1922 | Dedio | 7/163 X |
| 1,456,786 | 5/1923 | DeLuca | 30/162 |
| 4,063,356 | 12/1977 | Hepworth | 30/162 |
| 4,502,220 | 3/1985 | Aoki | 30/162 X |

Primary Examiner—Donald R. Schran
Assistant Examiner—Michael D. Folkerts
Attorney, Agent, or Firm—Limbach, Limbach & Sutton

[57] ABSTRACT

A multipurpose miniature hand tool includes two casings defining an outer housing. A roll of measuring tape, two scissor blades, and an elongated snap-off blade are extendably and retractably mounted within the outer housing. Each of the scissor blades are restricted to be movable only along one of the casings. A cap bolt extends through a lengthwise extending slide slot of each of the casings and through a pivot hole of each of the scissor blades and engages threadably with a nut for fastening tightly the casings and the scissor blades thereon. When the nut is somewhat loosed from the bolt, the nut and the bolt can slide along the slide slots of the casings together with the scissor blades, thereby permitting the scissor blades to extend partially out of the outer housing. At that time, the casings from the movable handles of a pair of scissors.

5 Claims, 6 Drawing Sheets

EXTENDABLE AND RETRACTABLE MULTIPURPOSE MINIATURE HAND TOOL FOR USE IN MEASUREMENT, SNIPPING, AND CUTTING

BACKGROUND OF THE INVENTION

This invention relates to a hand tool, and more particularly to an extendable and retractable multipurpose miniature hand tool for use in measurement, snipping, and cutting.

As is well known, measuring rules, knives, and scissors are common hand tools. However, it is difficult to carry all of these three types of hand tools together unless they are placed in a container. Since the volume of such containers is too large to carry conveniently, it is desirable to incorporate these hand tools into a single particularly rigid container which would enable these hand tools to both extend from and retract into the container.

SUMMARY OF THE INVENTION

It is therefore the main object of this invention to provide an extendable and retractable multipurpose miniature hand tool for use in measurement, snipping, and cutting.

Another object of this invention is to provide an extendable and retractable multipurpose miniature hand tool with a rigid container which acts as a handle when the hand tool is used.

Still another object of this invention is to provide a multipurpose miniature hand tool with a clip so that the hand tool can be attached to the pockets of clothes.

According to this invention, the multipurpose hand tool includes two elongated casings collectively defining an outer housing, and two mutually abutting scissor blades each mounted slidably on one of the casings within the outer housing. Each of the casings has a lengthwise extending slide slot. Each of the scissor blades has a pivot hole. An adjustable pivot member extends through the slide slots of the casings and the pivot holes of the scissor blades for fastening tightly the casings thereon. The pivot member can be adjusted to slide along the slide slots with the scissor blades thereby permitting the scissor blades to extend partially out of the outer housing. When the scissor blades extend out of the respective scissor blade thereby acting as movable handles so that a pair of scissors is formed.

The outer housing is formed with a cylindrical chamber in which a roll of steel measuring tape is mounted rotatably in a known manner. A spring biased abutment member is mounted movably on said outer housing for pressing against said tape for preventing said tape from movement. When it is desired to use the tape, the abutment member is actuated to release the tape to be pulled partially out of the outer housing.

Also provided is an elongated flat-blade cutter which is mounted slidably within said outer housing and which has a beveled long edge. The blade cutter has a pushable clip extending outwardly of said outer housing for being pushed to permit the blade cutter to extend partially out of the outer housing. The clip can used for attaching the hand tool to the pockets of clothes.

BRIEF DESCRIPTION OF THE DRAWINGS

Other features and advantages of this invention will become apparent from the following detailed description of a preferred embodiment of this invention with reference to the accompanying drawings in which.

DETAILED DESCRIPTION OF THE PREFERRED EMBODIMENT

Figure 1:
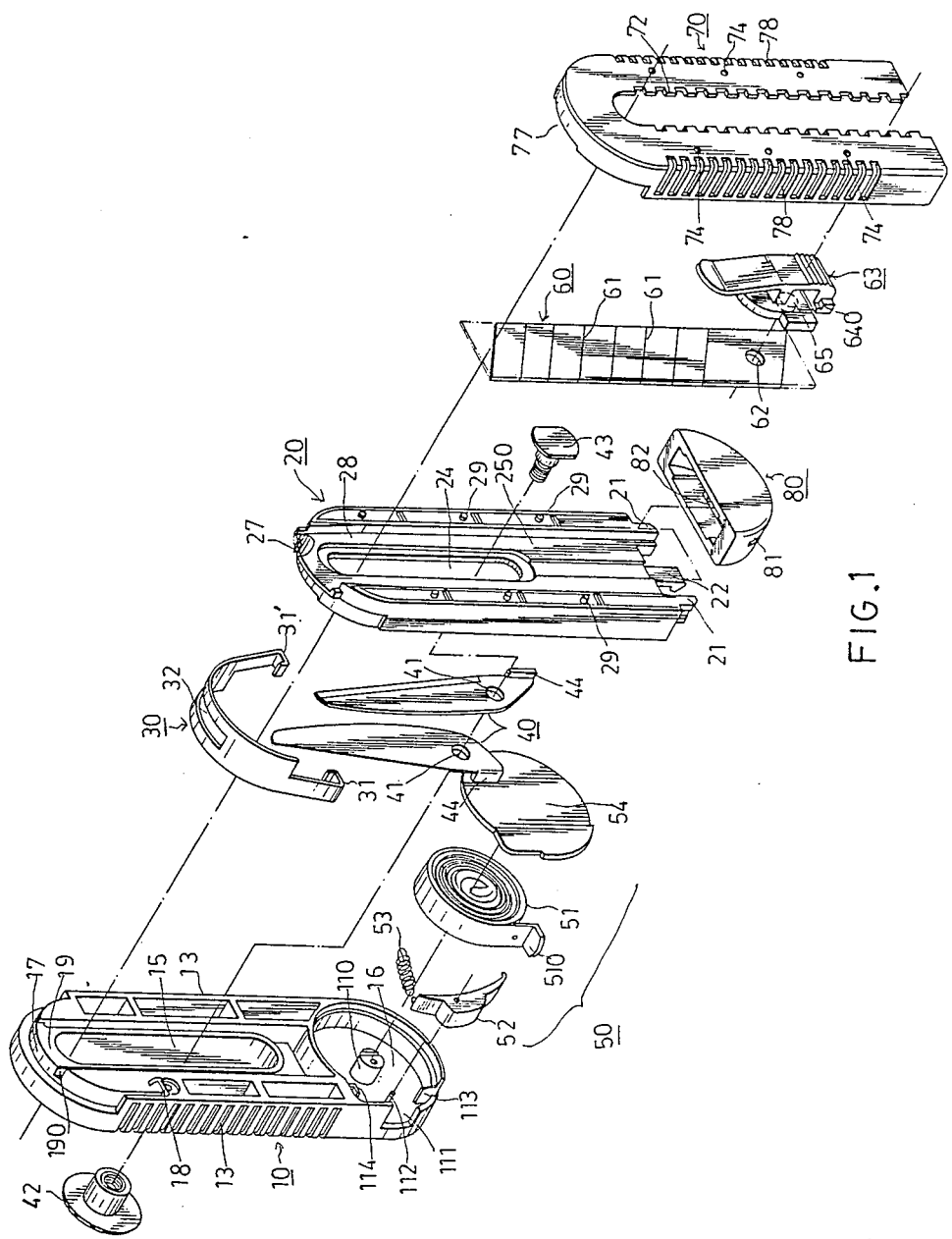
FIG. 1 is an exploded view of an extendable and retractable multipurpose miniature hand tool according to this invention.

Referring to FIG. 1, a multipurpose miniature hand tool of this invention includes a plastic first casing 10, a plastic second casing 20, a metal arcuate spring member 30, a pair of scissor blades 40, a nut 42, an adjusting bolt 43, a winding tape means 50, a snap-off blade 60, a plastic clip 63, a plastic casing cover 70, and a plastic blade snapping member 80. The winding tape means 50 includes a roll of measuring steel tape 51, a plastic abutment member 52, a spring 53 carried on the abutment member 52, and a plastic seal plate 54. The first casing 10, second casing 20, and cover 70 define together an outer housing.

The method of assembling all the above-metioned elements may include the following steps:

(1) placing the roll of tape 51 into a cylindrical chamber 16 of the first casing 10 in such a manner that the inner end of the tape 51 attaches to a large-diameter pivot pin 110 while permitting the curved outer end 510 of the tape 51 to be pressed by a curved flexible tongue 113, that is to say, the curved outer end 510 is exposed to an opening 111, (2) sleeving rotatably the abutment member 52 on a small-diameter pivot pin 112 and subsequently attaching the free end of the spring 53 to a spring seat 114 so that the free end of the abutment member 52 presses against the outer end of the tape 51, thereby preventing the tape 51 from movement;

(3) placing the seal plate 54 onto a stepped portion of the wall defining the cylindrical chamber 16 to seal the cylindrical chamber 16;

(4) placing the spring member 30 onto a stepped end portion 17 of the first casing 10 while permitting a first curved end 31 of the spring member 30 to engage with a first J-shaped slot 18 of the first casing 10;

(5) placing one of the scissor blades 40 into a first blade passage 19 of the first casing 10 while permitting a lug 44 of the scissor blade 40 to be inserted into a first guide slot 190 of the first casing 10;

(6) inserting two feet 21 and a central barb 22 of the second casing 20 into a retaining groove 82 of the blade snapping member 80 so that the blade snapping member 80 is secured to the second casing 20;

(7) overlapping the other of the scissor blades 40 on the first scissor blade 40 and subsequently engaging the first casing 10 with the second casing 20 along with the blade snapping member 80 so that the spring member 30, the scissor blades 40, and the winding tape means 50 are confined between the first and second casings 10 and 20 while permitting a lug 44 of the second scissor blade 40 to be inserted into a second guide slot 27 of the second casing 20 and simultaneously permitting a second curved end 31' of the spring member 30 to engage with a second J-shaped slot (not shown) of the second casing 20, which is positoned at the portion 28, but formed in the surface facing toward the first casing 10 so that it can not be viewed from FIG. 1;

(8) inserting the bolt 43 through a slide slot 24 of the second casing 20, the pivot holes 41 of the scissor blades 40, and a slide slot 15 of the first casing 10 and subsequently screwing the nut 42 to the bolt 43;

(9) placing the snap-off blade 60 into a second blade passage 250 of the second casing 20 and subsequently inserting a cylindrical tongue 65 of the clip 63 into a hole 62 of the snap-off blade 60; and

Figure 2:
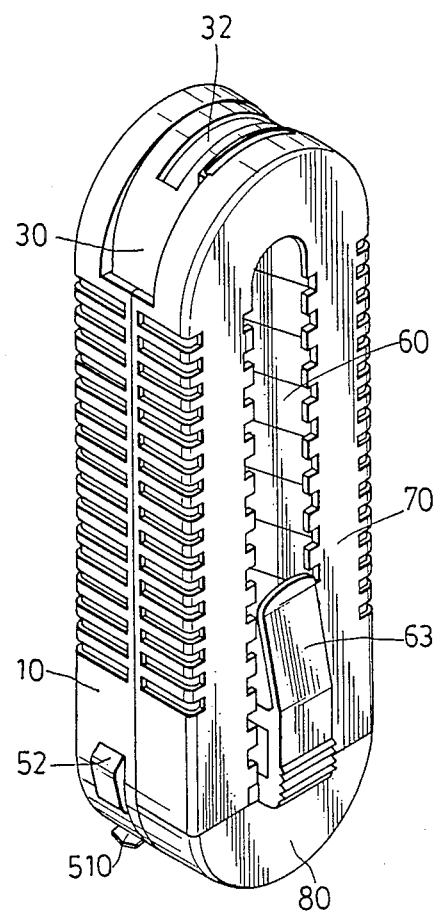
FIG. 2 is an assembled view illustrating the configuration of the multipurpose miniature hand tool when not in use.

(10) engaging through holes 74 of the cover 70 with tongues 29 of the second casing 20 and subsequently securing the cover 70 to the second casing 20 by high frequency technique so that the openings of the through holes 74 are closed, as shown in FIG. 2.

Figure 3:
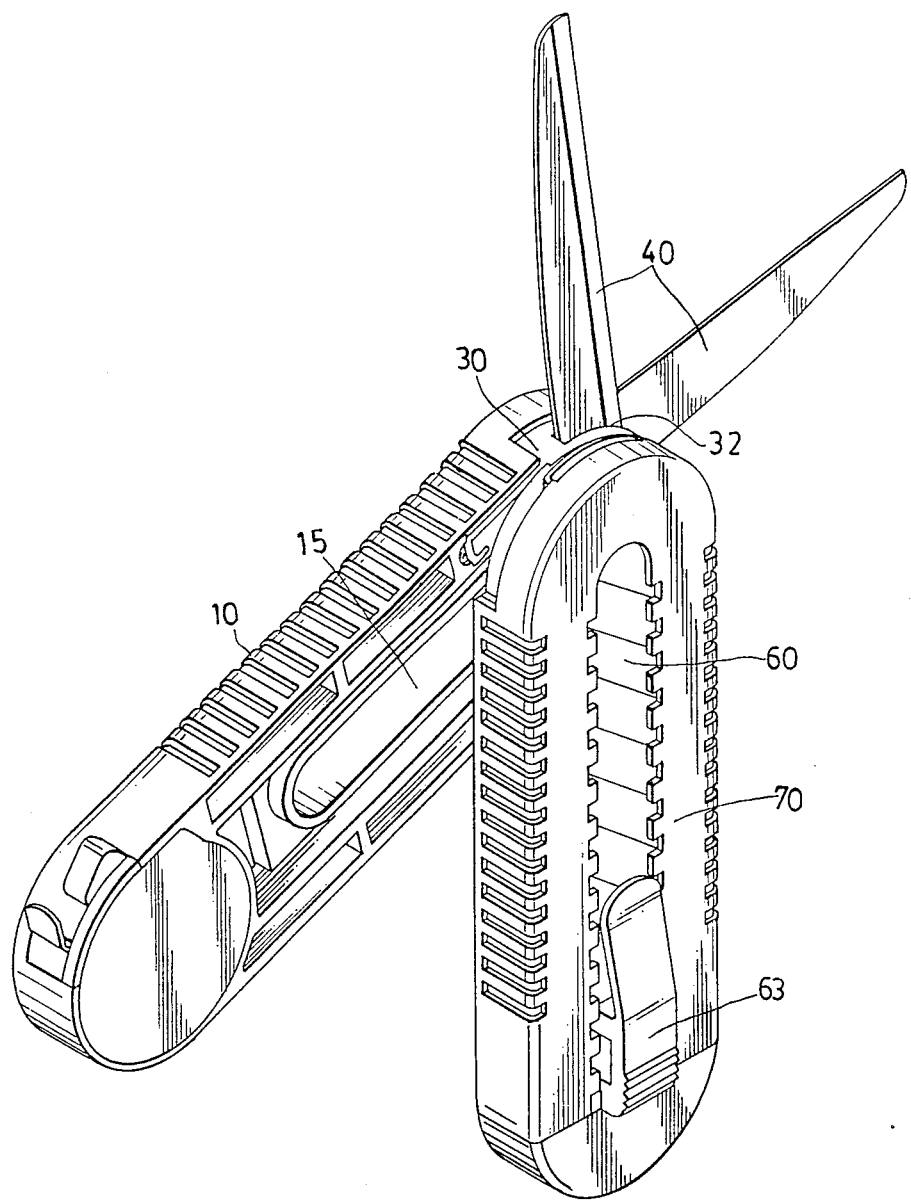
FIG. 3 is a schematic perspective view illustrating the configuration of the multipurpose miniature hand tool when acting as a pair of scissors.

When the nut 42 is somewhat loosed from the bolt 43, the nut 42 may be moved so that the scissor blades 40 slide along the first blade passage 19. When the nut 42 is moved to the leading end of the slide slots 15 and 24 so that the scissors blades 40 extend partially out of the casings 10 and 20 through a rectanuglar scissors slot 32 formed in the spring member 30, the tail ends of the casings 10 and 20 will be biased by the spring member 30 to separate from each other, as shown in FIG. 3. Because the pivotally interconnected scissor blades 40 are connected rigidly to the first and second casings 10 and 20 respectively, the casings 10 and 20 serve as movable handles so that a pair of scissors is formed. With the spring member 30 interconnecting elastically the casings 10 and 20, in use, when the casings 10 and 20 are released from the hand of the user, the hand tool will automatically return to the configuration shown in FIG. 3 for next snipping action.

Figure 4:
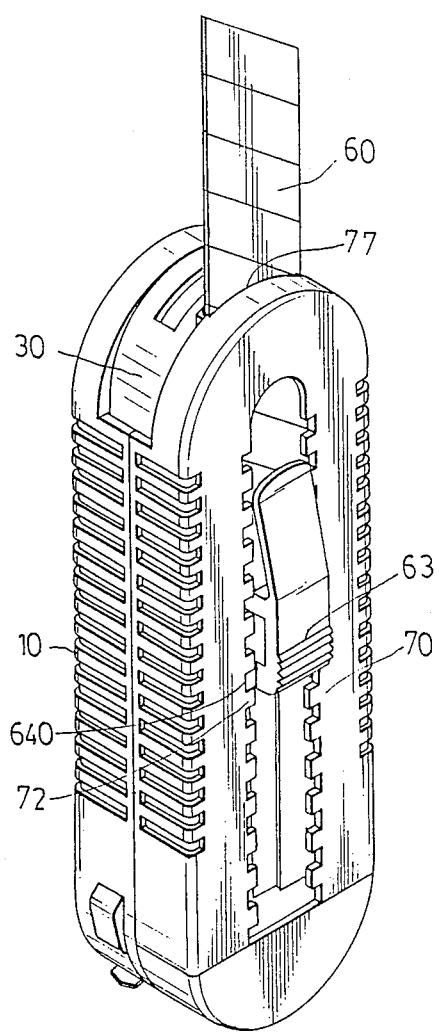
FIG. 4 is a schematic perspective view illustrating the configuration of the multipurpose miniature hand tool when acting as a knife.

Referring to FIG. 4, when it is desired to use the snap-off blade 60, the clip 63 can be pushed so that the snap-off blade 60 slides along the second blade passage 250 to extend partially out of the casings 10 and 20 through a cutter slot 77 formed in an end of the cover 70.

The inner edge of the cover 70 is formed with a row of teeth 72. The clip 63 is formed with a transversely extending flexible arm 640. When the flexible arm 640 is inserted between any adjacent two of the teeth 72, the snap-off blade 60 is positioned relative to the cover 70. When it is desired to use the snap-off blade 60, the clip 63 can be pushed so that the snap-off blade 60 slides along the second blade passage 250 to extend partially out of the casings 10 and 20 through a cutter slot 77 formed in an end of the cover 70, as shown in FIG. 4.

Figure 5:
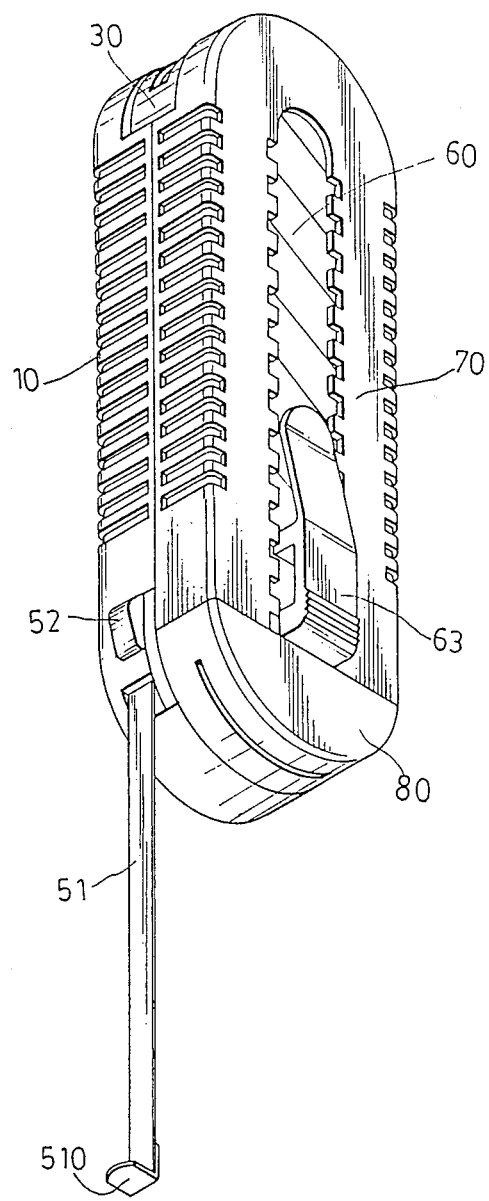
FIG. 5 is a schematic perspective view illustrating the configuration of the multipurpose miniature hand tool when acting as a measuring tape.

Referring to FIG. 5, because the winding tape means 50 of this invention is similar to conventional measuring tape in construction, it can be used in a known manner. That is to say, when the abutment member 52 is pressed by hand, the tape 51 is released from the abutment member 52 and thus may be pulled out of the casings 10 and 20 for the purpose of measurement. When the tape 51 is no longer pulled, the abutment member 52 may be release from the hand to press against the tape 51 so that the tape 51 can neither extend from nor retract into the casings 10 and 20.

Figure 6:
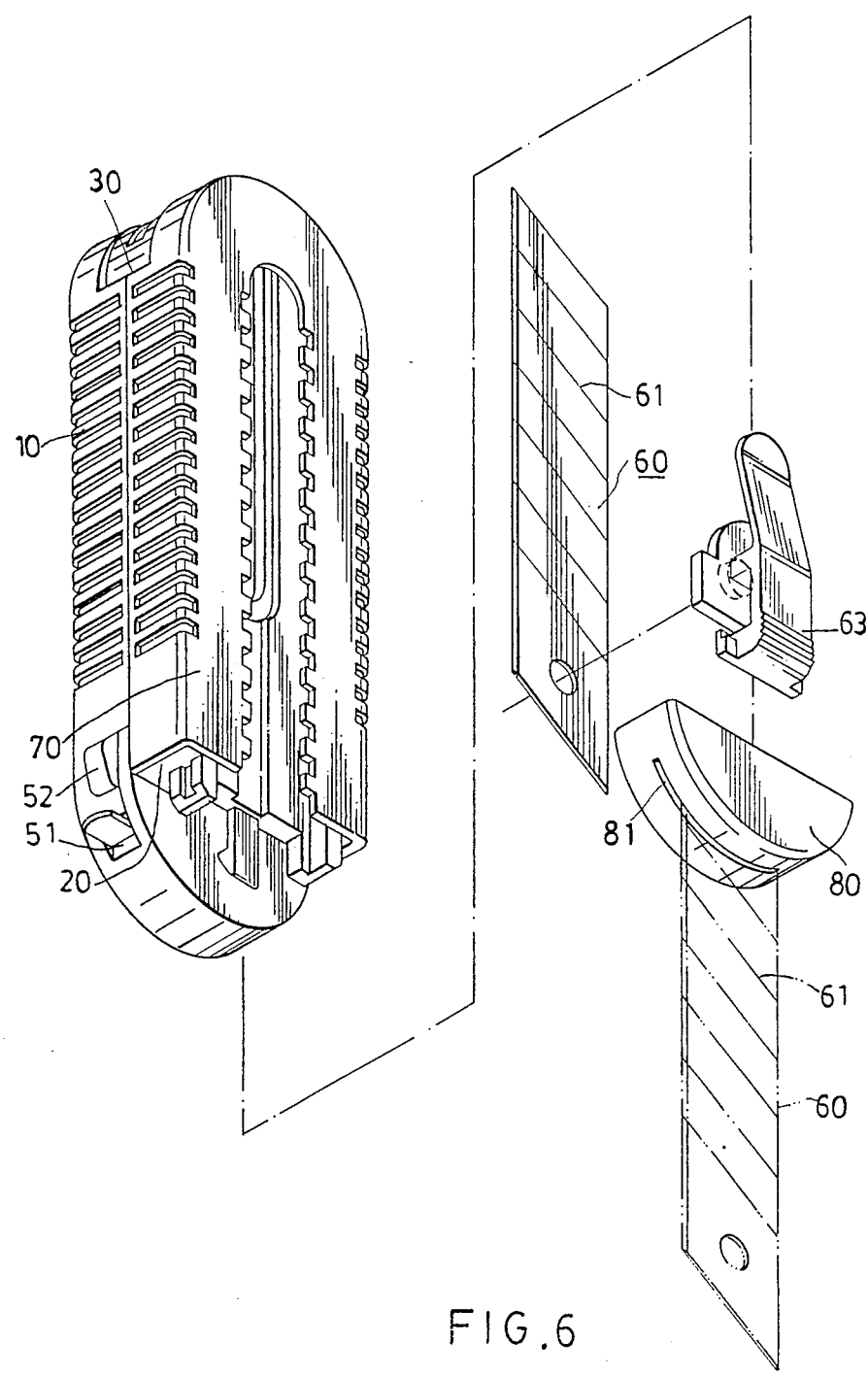
FIG. 6 is a schematic perspective view illustrating how a snap-off blade of the multipurpose miniature hand tool is easily snapped.

The use of the blade snapping member 80 will now be described. Referring to FIG. 6, after part of the snap-off blade 60 has been worn, the snap-off blade 60, the clip 63, and the blade snapping member 80 will be removed from the casings 10 and 20. Then, the snap-off blade 60 is inserted through a slit 81 of the blade snapping member 80 thereby permitting the snap-off blade 60 to be easily snapped in two along one of the weaken lines 61 each of which is defined by a transversely extending slot. As a result, the worn portion of the snap-off blade 60 can be removed from the remaining portion of the snap-off blade 60.

As illustrated, each of the first casing 10 and the cover 70 is formed with toothed portions 13, 78 on the side surfaces thereof for facilitating convenient grip. In addition, the clip 63 is designed so that the multipurpose miniature hand tool can be attached to the pockets of clothes.

With this invention thus explained, it is apparent that various modifications and variations can be made without departing from the scope and spirit of this invention. It is therefore intended that this invention be limited only as indicated in the appended claims.

I claim:

1. A multipurpose hand tool comprising:

two elongated casings collectively defining an outer housing in which a generally cylindrical chamber is formed, said cylindrical chamber having an opening for being communicated with exterior of said outer housing, one of said casings including a casing body and a cover between which a cutter slot is formed, said cutter slot being open at an end of said outer housing, each of said casings formed therein with a lengthwise extending slide slot and a lengthwise extending guide slot, said slide slots opposing each other;

two opposed scissor blades, mounted slidably within said outer housing between said casings, abutting against each other, each of said scissor blades including a lug projecting therefrom to insert into said guide slot of one of said casings for sliding along the length of said corresponding casing to extend partially out of said outer housing, each of said scissor blades having a pivot hole formed therein, said pivot holes opposing each other;

an elongated pivot member having an intermediate portion extending through said slide slots of said casings and said pivot holes of said scissor blades, and two enlarged ends fastening tightly said casings therebetween, so as to interconnect pivotally said scissor blades, one of said enlarged ends being movable relative to the other of said enlarged ends so that said pivot member can be released to slide along said slide slots, thereby permitting said scissor blades to extend partially out of said outer housing through said scissors slot;

a spring member, interconnecting adjacent ends of said casing for biasing free ends of said casings to separate from each other to a predetermined extent when said scissor blades extend partially out of said outer housing, having a scissors slot for extension of said scissor blades from said outer housing therethrough;

a roll of measuring steel tape, mounted rotatably within said cylindrical chamber, having an inner end mounted pivotally on said outer housing, and an outer end extendable out of said outer housing through said opening;

a spring biased abutment member, mounted movably on said outer housing, pressing against said tape for preventing said tape from movement, actuatable to release said tape therefrom; and an elongated flat-blade cutter, mounted slidably within said outer housing between said casing body and said cover, having a beveled long edge, pushable to extend partially out of said outer housing through said cutter slot;

whereby, when said scissor blades extend partially out of said outer housing, said casings are connected rigidly to respective said scissor blades thereby forming two movable handles; when said abutment member is actuated, said tape can be pulled partially out of said outer housing.

2. A multipurpose hand tool as claimed in claim 1, wehrein said blade cutter has a plurality of transversely extending open-ended slots which are in parallel with one another for defining weakened lines in said blade cutter, whereby, after an end portion of said beveled edge is worn, corresponding end portion of said blade cutter can be removed from remaining portion of said blade cutter by snapping said blade cutter in two along one of said weakened lines defined by said open-ended slots.

3. A multipurpose hand tool as claimed in claim 1, wherein said pivot member includes a cap bolt extending through said slide slots of said casings and said pivot holes of said scissor blades, and a nut engaged threadably with said cap bolt.

4. A multipurpose hand tool as claimed in claim 1, wherein said outer housing includes a blade passage for sliding movement of said blade cutter therein, and a row of teeth provided along said blade passage, and wherein said blade cutter is formed with a transversely extending flexible arm dimensioned for insertion between two adjacent ones of said teeth for preventing said blade cutter from movement relative to said outer housing.

5. A multipurpose hand tool as claimed in claim 1, wherein said blade cutter includes a clip extending outwardly of said outer housing of being pushed and for being attached to a pocket.

* * * * *